Aug. 27, 1940.  W. H. WOOD  2,212,871
FLUID PRESSURE OPERATED MOTOR
Filed Oct. 29, 1938   2 Sheets-Sheet 1

Inventor
WALLACE H. WOOD
By Harold W. Eaton
Attorney

Patented Aug. 27, 1940

2,212,871

UNITED STATES PATENT OFFICE 2,212,871

FLUID PRESSURE OPERATED MOTOR

Wallace H. Wood, Worcester, Mass., assignor to Norton Company, Worcester, Mass., a corporation of Massachusetts Application October 29, 1938, Serial No. 237,654

3 Claims. (Cl. 121—157)

The invention relates to fluid pressure operated motors, and more particularly to a relatively small high speed reciprocatory fluid motor.

One object of the invention is to provide a simple, thoroughly practical fluid pressure motor. A further object of the invention is to provide a simple, compact, high speed reciprocatory fluid pressure operated motor. A further object of the invention is to provide a small, compact, high speed fluid motor capable of transmitting a rapid reciprocatory stroke. A further object of the invention is to provide a control valve for a fluid motor comprising a hollow pilot valve having a shuttle valve contained therein which serves as a reversing valve. Other objects will be in part obvious or in part pointed out hereinafter.

The invention accordingly consists in the features of constructions, combinations of elements, and arrangements of parts, as will be exemplified in the structure to be hereinafter described, and the scope of the application of which will be indicated in the following claims.

Figure 1:
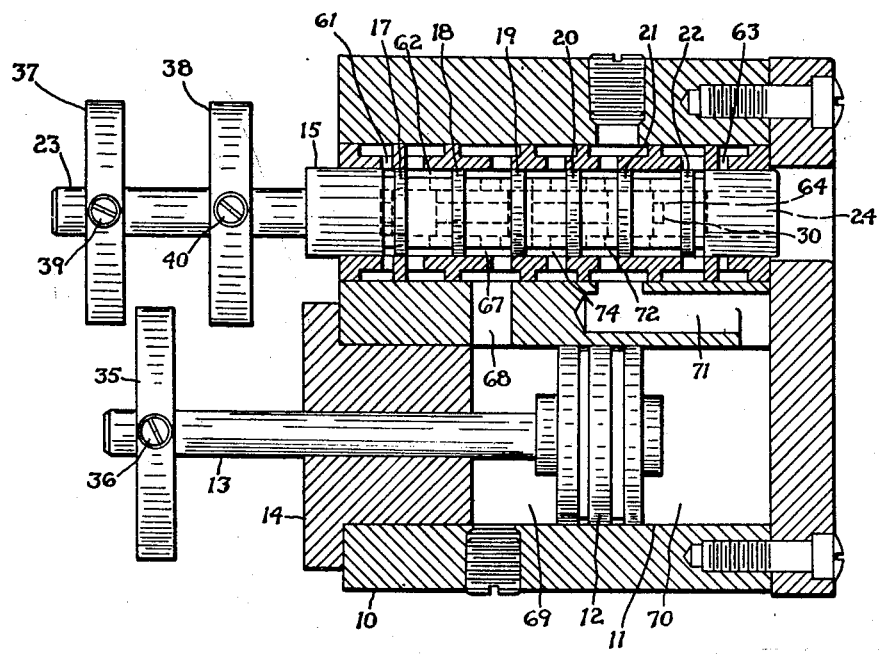
Figure 3:
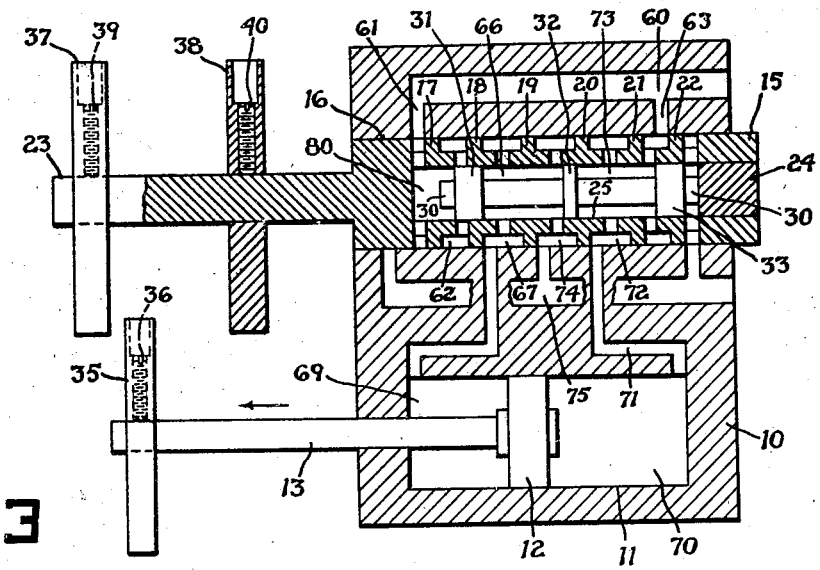
Figure 2:
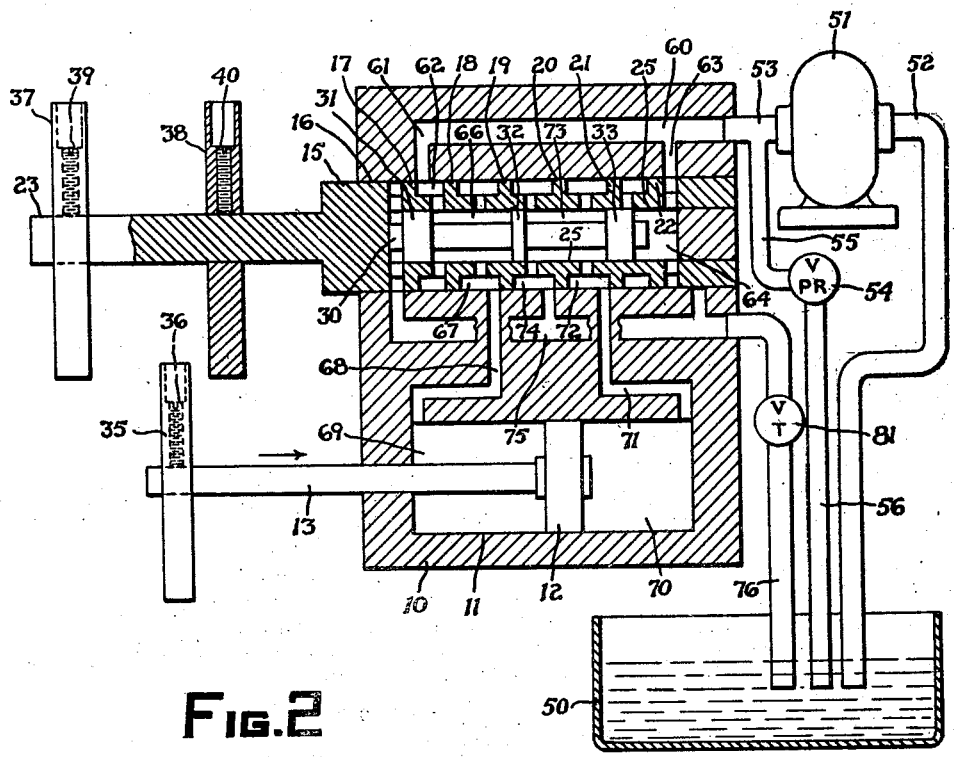

In the accompanying drawings, in which is shown one of various possible embodiments of the mechanical features of this invention, Fig. 1 is a fragmentary longitudinal sectional view through the improved fluid pressure operated motor;

Fig. 2 is a diagrammatic sectional view through the improved motor together with a piping diagram of the fluid pressure system; and Fig. 3 is a similar sectional view through the fluid motor, showing the positions of the valves as the piston approaches the end of its stroke toward the left.

A fluid pressure operated motor has been illustrated in the drawings comprising a motor casing 10 having a cylinder 11 formed therein. A piston 12 is slidably mounted within the cylinder 11 and is fixedly connected to one end of a piston rod 13 which passes through a cylinder head 14 and extends outside the casing 10 of the motor. A pilot valve 15 is slidably mounted within a bore 16 within the casing 10. The pilot valve 15 is preferably a piston type valve formed as a hollow tubular member (Fig. 1), to one end of which is attached a valve stem 23. A plurality of valve pistons 17, 18, 19, 20, 21 and 22 are formed integral with said tubular member. The other end of the hollow tubular pilot valve 15 is closed by means of a plug 24. An inner cylindrical bore 25 of the pilot valve 15 contains a shuttle reversing valve 30.

In order to attain one object of the invention, it is desirable to provide a valve mechanism which is so constructed and arranged that a high speed valve action may be obtained to produce a high speed reciprocatory movement of the piston 12. This is accomplished by providing a relatively light weight reversing valve which, as shown in the drawings, is a piston type shuttle valve comprising a valve stem 30 having formed integrally therewith valve pistons 31, 32 and 33.

The valve stem 23 of the pilot valve 15 is actuated by the movement of the piston 12 through an adjustable member, such as a collar 35, which is adjustably mounted on the valve stem 23 by a set screw 36. The pilot valve stem 23 is provided with a pair of spaced adjustable dogs or collars 37 and 38 which are adjustably secured on the valve stem 23 by set screws 39 and 40, respectively. The piston 12, through the collar 35, engages either the collar 37 or the collar 38 to shift the pilot valve 15 to initiate a reversal in direction of movement of the piston 12. The pilot valve 15 will be moved at a rapid rate from one position to the other, this rate of movement being substantially equal to the rate of movement of the piston 12. During this movement of the pilot valve 15, the shuttle or reversing valve 30 is moved at the same rate. After the reverse port of the pilot valve has been opened, fluid under pressure continues the movement of the reversing valve rapidly to shift it into its reverse position with respect to the pilot valve to cause a reversal in direction of flow of the fluid under pressure to the cylinder 11. It will be readily appreciated from the foregoing disclosure that a high speed reciprocatory movement may be obtained, particularly in cases where a short rapid stroke of a piston is desired. By utilizing a construction of this type, it is possible to provide a fluid motor whereby a reciprocatory piston movement may be translated into a rapid mechanical movement of machine parts and a reciprocatory stroke of one-sixteenth of an inch may be obtained at the rate of approximately one thousand oscillations of the piston per minute.

A fluid pressure system for supplying fluid under pressure has been illustrated in Fig. 2 comprising a reservoir or sump 50. A fluid pressure pump 51, which has been indicated as a gear type pump, draws fluid from the reservoir 50, through a pipe 52, and passes fluid under pressure through a pipe 53 to the motor casing 10. An adjustable pressure relief valve 54 is connected by means of a pipe 55 with the pipe 53 between the pump 51 and the motor casing 10. This relief valve 54 serves to exhaust excess fluid under pressure through the pipe 56 and return it to the reservoir 50.

Fluid under pressure from the pipe 53 enters a passage 60 within the motor casing 10 and may pass through a passage 61 to a pilot valve chamber 62 located between the valve pistons 17 and 18 or may pass through a passage 63 which in the position illustrated in Fig. 2 passes fluid through pilot valve ports into a chamber 64 located within the hollow pilot valve bore 25, between the shuttle valve piston 33 and the left-hand end of the bore (Fig. 2). Admission of fluid to the valve chamber 64 causes the shuttle valve 30 to move toward the left into the position shown in Figs. 1 and 2 and to maintain it in this position during the movement of the piston 12. In the position of the valves (Fig. 2), fluid entering the pilot valve chamber 62 passes into the hollow bore 25, into a shuttle or reverse valve chamber 66 located between the shuttle valve pistons 31 and 32, and passes out through pilot valve chamber 67 located between the pilot valve pistons 18 and 19 and passes out through passage 68, into a cylinder chamber 69 located at the left-hand end of the cylinder 11 to produce a movement of the piston 12 toward the right (Figs. 1 and 2). During the movement of the piston 12 toward the right, fluid within a cylinder chamber 70 exhausts through a passage 71, through a pilot valve chamber 72, into a shuttle or reverse valve chamber 73 located between the shuttle reverse valve pistons 32 and 33, and passes through a pilot valve chamber 74 located between the pilot valve pistons 19 and 20, and through a passage 75 and a pipe 76 which exhausts into the reservoir 50.

The movement of the piston 12 continues toward the right (Figs. 1 and 2) until the collar 35 engages the collar 38 and moves the pilot valve 15 toward the right into the position illustrated in Fig. 3. When the pilot valve 15 moves toward the right, the reverse or shuttle valve 30 is carried therewith at the same rate of speed. The throttle or reverse valve remains in the same position relative to the pilot valve 15, as shown in Fig. 2, until the pilot valve 15 assumes the end position, as illustrated in Fig. 3. In this position of the parts, fluid under pressure is admitted through the passage 61 and into a shuttle or reverse valve chamber 80 located within the bore 25 of the pilot valve 15 between the valve piston 31 and the end of said hollow aperture and serves to shift the shuttle valve 30 toward the right (Fig. 3) so as to reverse the flow of fluid to the cylinder 11 and to admit fluid under pressure to the cylinder chamber 70 to produce a movement of the piston 12 toward the left (Fig. 3). During the movement of the piston 12 toward the left, fluid within the cylinder chamber 69 is exhausted through the passage 68, through the pilot valve and reverse valve chambers, and out through the passage 75 and the pipe 76 into the reservoir 50. A combined stop, start and throttle valve 81 is provided to control the stopping, starting and speed of the motor. This valve may be located in either the intake or exhaust side of the fluid pressure system. In the preferred construction, the combined stop, start and throttle valve 81 is located in the exhaust pipe line 76 so as to regulate the exhaust of fluid from the motor casing 10 and thereby facilitate an adjustment of the speed of reciprocation of the piston 12, and also to facilitate stopping and starting said motor.

This improved fluid pressure operated motor is particularly adapted for use where a small amount of power transmission is desired and where a high speed reciprocatory stroke is required.

The operation of this fluid pressure motor will be readily apparent from the foregoing disclosure. The collars 37 and 38 are adjusted longitudinally on the valve stem 23 so that the required length of reciprocatory stroke is obtained. By varying the position of the collars 37 and 38, not only the extent of the reciprocatory stroke but the relative position of the stroke may be varied as desired. The throttle valve 81 located in the exhaust pipe line 76 may serve not only as a stop and start valve but also as a throttle valve to regulate and govern the speed of reciprocation of the piston 12 by controlling the exhaust of fluid from the motor 10. When it is desired to start the motor, the valve 81 is opened to the desired extent to start the motor and to obtain the desired motor speed.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a fluid motor, a casing, a cylinder formed therein, a piston slidably mounted in said cylinder, a piston rod having one end connected to move with said piston and the other end projecting from said casing, a hollow piston type pilot valve slidably mounted in said casing, a piston type reversing valve slidably mounted within said hollow pilot valve which is arranged to reverse the flow of fluid to said cylinder, and means actuated by said piston simultaneously to shift the pilot and reverse valve so as to change the direction of flow of fluid under pressure which serves to complete the shifting of the reversing valve.

2. In a fluid motor, a casing, a cylinder formed therein, a piston slidably mounted in said cylinder, a piston rod one end of which is fixedly connected to said piston and the other end of which projects from said casing, a piston type pilot valve longitudinally movable in said casing and arranged to slide axially in a direction parallel to said cylinder, a longitudinally extending cylindrical bore within said pilot valve, a piston type shuttle valve slidably mounted within said central bore in the pilot valve which is arranged to reverse the flow of fluid to said cylinder, and means including adjustable dogs actuated by movement of said piston simultaneously to shift said pilot and shuttle valves so as to reverse the flow of fluid under pressure.

3. In a fluid motor, a casing, a cylinder formed therein, a piston slidably mounted in said cylinder, a piston rod having one end fixed to said piston and the other end projecting outside said casing, a valve actuating member adjustably mounted on said rod, a piston type pilot valve slidably mounted in said casing and having a valve stem projecting therefrom, a cylindrical bore in said valve, adjustable dogs on said pilot valve stem operatively connected to move said pilot valve, and a piston type shuttle valve slidably mounted within said bore in the pilot valve which is arranged to reverse the flow of fluid under pressure to said cylinder, said shuttle valve being moved with and by said pilot valve and the reverse movement of the shuttle valve being completed by fluid under pressure.

WALLACE H. WOOD.